H. MARKHAM.
MUD GUARD FOR MOTOR VEHICLES.
APPLICATION FILED MAY 16, 1914.

1,129,702.

Patented Feb. 23, 1915.

Witnesses

Inventor
H. Markham

UNITED STATES PATENT OFFICE.

HERBERT MARKHAM, OF FULHAM, LONDON, ENGLAND.

MUD-GUARD FOR MOTOR-VEHICLES.

1,129,702.  Specification of Letters Patent.  Patented Feb. 23, 1915.

Application filed May 16, 1914. Serial No. 839,092.

*To all whom it may concern:*

Be it known that I, HERBERT MARKHAM, a subject of His Majesty the King of England, residing at 187 New King's road, Fulham, in the county of London, Kingdom of England, have invented certain new and useful Improvements in and Relating to Mud-Guards for Motor-Vehicles, of which the following is a specification.

This invention relates to improvements in mudguards for motor vehicles.

The invention relates particularly to mudguards other than those mounted on the axle and has for its primary object the provision of means whereby the mudguard is caused to move upward when the wheel rises beyond a predetermined point. A further object being the arrangement whereby such means is independent of contact of the wheel with the mudguard.

The invention is hereinafter described with reference to the accompanying drawings in which:—

Figure 1:
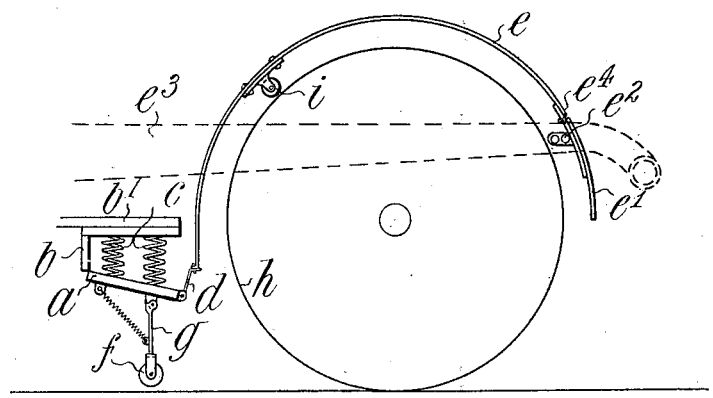
Figure 2:
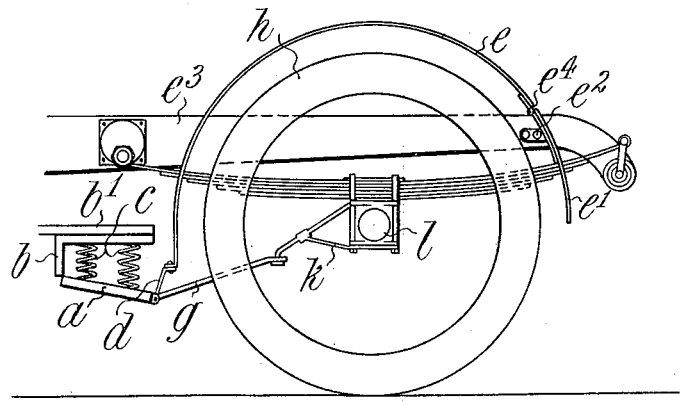

Figure 1 is a detail side elevation showing the improved device fixed in position; and Fig. 2 is a similar view illustrating a slightly modified arrangement.

As shown a flat plate $a$ of wood or metal hinged to a vertical piece $b$ also of wood or metal arranged below the platform $b'$ is controlled by a spring or springs $c$ disposed between itself and the platform and is connected by a hinged piece $d$ or the like to the end of the mudguard $e$. The other end part $e'$ of the mudguard $e$ is rigidly attached by a bracket or the like $e^2$ to the frame of the chassis $e^3$ and it is connected with the other part of the mudguard $e$ by a hinge $e^4$. The whole arrangement is made to keep the mudguard $e$ in one position clear of the wheel $h$ as the body of the vehicle goes down. This may be effected either in the manner shown in Fig. 1 or in Fig. 2. In the former arrangement as the body of the vehicle goes down a small wheel $f$ carried by a spring controlled rod $g$ on the spring controlled part $a$ touches the ground and the springs $c$ and hinge thus prevent the mudguard $e$ from touching the wheel $h$ of the vehicle. In the case of the wheel $h$ bumping at a different time from the spring controlled part $a$ a small wheel or the like $i$ is fixed on the underside of the mudguard $e$ so as to lift the mudguard with the rest of the road wheel. If desired the wheel $f$ may as shown in Fig. 2 be dispensed with and the arm $g$ could be connected to a clamp $k$ secured upon the axle $l$ of the wheel $h$, the arrangement operating in a similar manner to that previously described with reference to Fig. 1.

What I claim as my invention and desire to secure by Letters Patent of the United States is:—

1. The combination with the wheel of a road vehicle, of a mudguard, and means carried by the vehicle whereby the mudguard is caused to move upward when the wheel rises beyond a predetermined point, said means comprising a lever connected to the mudguard whereby the mudguard is moved upwardly as the vehicle body descends.

2. The combination with the wheel of a road vehicle of a mudguard and means whereby the mudguard is caused to move upward when the wheel rises beyond a predetermined point, such means being independent of contact of the wheel with the mudguard and comprising a hinged attachment at one end of the mudguard and a spring controlled attachment for connecting said hinged attachment to the step of the vehicle.

3. The combination with the wheel of a road vehicle of a mudguard and means whereby the mudguard is caused to move upward when the wheel rises beyond a predetermined point, such means being independent of contact of the wheel with the mudguard and comprising a hinged attachment secured to the step of the vehicle and a wheel attached to said hinged attachment substantially as described.

4. The combination with the wheel of a road vehicle of a mudguard, means whereby the mudguard is caused to move upward when the wheel rises beyond a predetermined point, such means being independent of contact of the wheel with the mudguard and a wheel attached to the underside of the mudguard to prevent the mudguard fouling the road wheel of the vehicle.

5. The combination with the wheel of a road vehicle of a mudguard and means whereby the mudguard is caused to move upward when the wheel rises beyond a predetermined point, such means being independent of contact of the wheel with the mudguard said means having a spring attachment, and said mudguard having a hinge piece on its end opposite to the spring attachment to allow of the movement of the mudguard when the spring attachment causes the other end to rise.

6. The combination with the wheel of a road vehicle, of a mudguard and means whereby the mudguard is caused to move upward when the wheel rises beyond a predetermined point, such means being independent of contact of the wheel with the mudguard, and comprising a hinged attachment secured to the vehicle frame, and a depending member carried by the hinged attachment substantially as described.

In testimony whereof I have signed this specification in the presence of two subscribing witnesses.

HERBERT MARKHAM.

Witnesses:
J. S. WITHERS,
FRANK S. NAKEY.

Copies of this patent may be obtained for five cents each, by addressing the "Commissioner of Patents, Washington, D. C."